United States Patent
Amberger et al.

(10) Patent No.: US 6,259,995 B1
(45) Date of Patent: Jul. 10, 2001

(54) PROCESS AND DEVICE FOR DETERMINING WEAR IN A FRICTION CLUTCH

(75) Inventors: Alfred Amberger, Massbach; Frank Hirschmann, Niederwerrn, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/216,781

(22) Filed: Dec. 18, 1998

(30) Foreign Application Priority Data

Dec. 18, 1997 (DE) ................................. 197 56 451

(51) Int. Cl.$^7$ ....................................... G01B 3/00
(52) U.S. Cl. ............... 702/34; 702/33; 702/105; 702/113; 701/67; 192/30 W
(58) Field of Search ................ 702/34, 33, 104, 702/105, 113; 701/67, 68; 192/30 R, 30 W, 70.28, 3.51

(56) References Cited

U.S. PATENT DOCUMENTS 4,474,274  10/1984  Lutz et al. .
5,058,718 * 10/1991  Tojima et al. .................... 192/30 W
5,690,203 * 11/1997  Link et al. ........................ 192/70.25

FOREIGN PATENT DOCUMENTS

| 26 40 088 | 3/1978 | (DE) . |
| 29 16 807 | 4/1980 | (DE) . |
| 197 44 042 A1 | 4/1999 | (DE) . |
| 2 363 735 | 3/1978 | (FR) . |
| 2 496 204 | 6/1982 | (FR) . |

* cited by examiner

*Primary Examiner*—Kamini Shah
*Assistant Examiner*—Hien Vo
(74) *Attorney, Agent, or Firm*—Cohen, Pontani, Lieberman & Pavane

(57) ABSTRACT

A process and a device for determining the friction lining wear in a friction clutch with a clutch housing and a pressure plate, which is arranged axially movably therein and presses a clutch disk equipped with friction linings against a flywheel of an internal combustion engine. Three detecting elements are arranged at a defined axial distance to each other, and rotate with the friction clutch and a sensor is arranged outside of the clutch housing for finding the axial position of each detecting element, whereby at least one detecting element is connected to the clutch housing and the two other detecting elements are connected to the pressure plate.

6 Claims, 2 Drawing Sheets

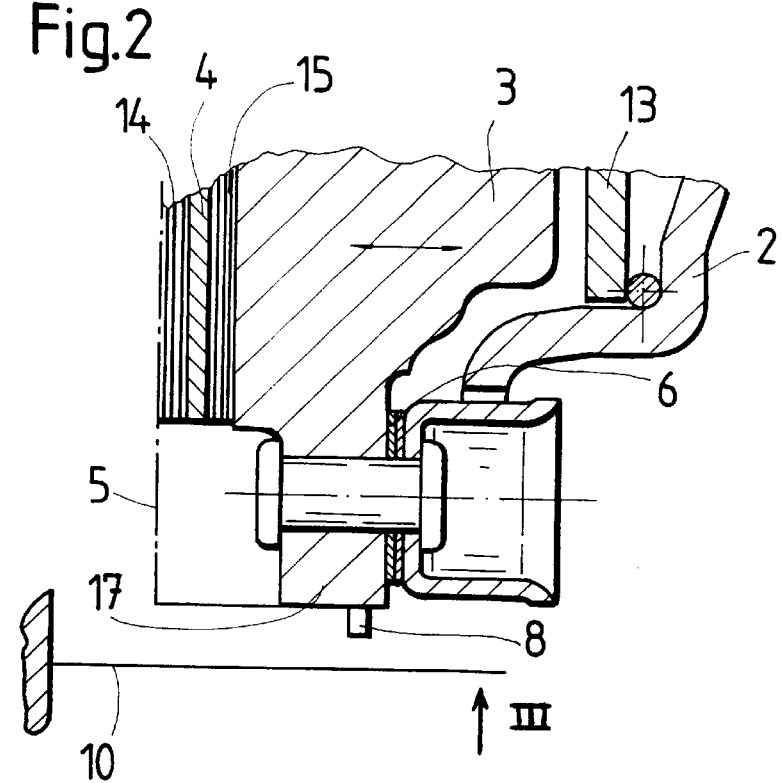
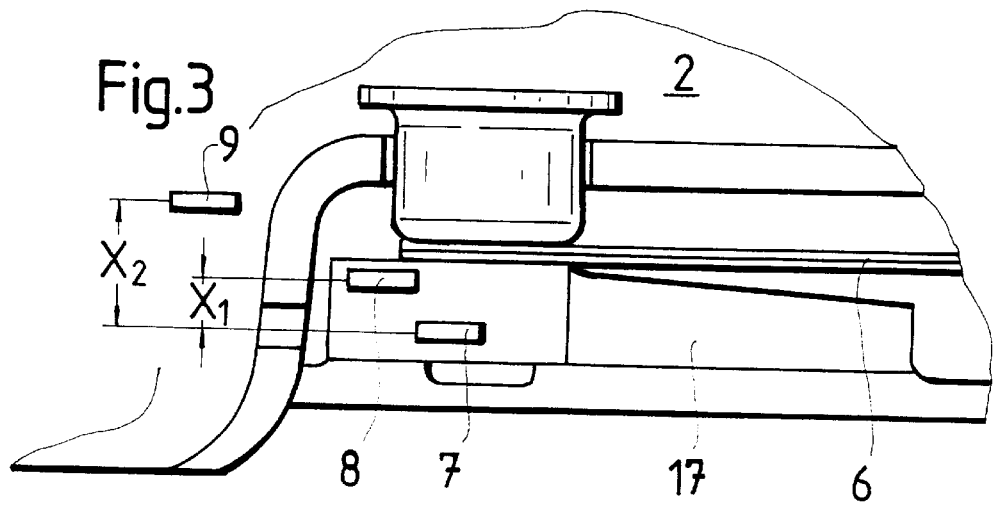

PROCESS AND DEVICE FOR DETERMINING WEAR IN A FRICTION CLUTCH

BACKGROUND OF THE INVENTION

1. Field of the Invention

The invention relates to a process for determining wear on the clutch disk of a friction clutch, which is pressed by a pressure plate arranged in the clutch housing, against a flywheel of an internal combustion engine. The invention further relates to a device with which this process can be implemented.

2. Discussion of the Prior Art

In light of the longer maintenance intervals sought by automobile manufacturers, it is desirable to have a device for determining wear on a clutch lining, so that the clutch disk can be exchanged in a timely manner, without any visual examination being needed in the meantime. It is conceivable either to continually determine, check and display the friction lining wear, or else to determine only a maximum permissible wear limit that, when reached, is displayed via a signal device.

For clutches in commercial vehicles, it is helpful to know the state of clutch wear, because unforeseen downtime results in costs that could have been avoided with better planning. Unpredictable wear-related factors can arise when the clutch is subjected to unusual stress due to other or different drivers or temporarily harder conditions of use.

German reference DE 26 40 088 A1 discloses a device for determining wear on a clutch disk lining, in which the axial position of the pressure plate is detected by a sensor. There is a marking on the pressure plate, which marking consists of two marks that extend in the axial direction of the clutch and are located one after the other in the circumferential direction of the pressure plate and of a third mark that connects the front end of one of the two marks to the rear end of the other mark (i.e., a Z-shape). An inductive sensor is inserted in an opening of the clutch housing. The sensor and the marking are oriented to each other in such a way that when the clutch is closed and the clutch disk lining is new, the effective direction of the sensor overlays a center line of the Z-shaped marking. Connected to the sensor is an analysis unit that has a display unit. The marking is located on the edge of the pressure plate so that, when the clutch is rotated, the marking passes in front of the sensor at a uniform distance. The sensor detects three passages. When the friction lining is new, the passage signals are equidistant from each other. When the friction lining becomes worn, the pressure plate, and with it the Z-shaped marking, moves farther in the direction of the flywheel. As a result, the effective direction of the sensor deviates from the center line, and a different chronological passage sequence is detected. From the chronological signal sequence, it is possible, via the electronic analysis unit, to determine the axial movement distance of the pressure plate and thus the wear of the friction lining, which can then be displayed.

Because the marking and the mechanical device to which the marking is attached are subject to mechanical play as well as to the influences of temperature and speed, additional axial movements of the marking occur. These cannot be distinguished from movements that result from wear. In this event, the signals are erroneous and indicate either too much wear or too little wear. In the former case, the clutch will be overhauled prematurely (which may increase maintenance costs only insignificantly). However, in the latter case, the danger exists that the clutch disk will be overhauled too late and that damage will be suffered by the flywheel as the rivets securing the friction linings to the clutch disk work themselves into the flywheel.

German reference DE 29 16 807 A1 discloses a distance sensing device for a friction clutch, in which pins that rest on a compression spring, are let into in the flywheel. The movement of a pin is transmitted via a lever to a ring, which is movable in the axial direction and interacts with a stationary approach switch arranged on the clutch housing. When the clutch is closed, the pins are pressed by the clutch disk against the force of the compression spring into the flywheel. This distance sensing device is intended to determine, particularly in trucks, the exact operational point at which the clutch closes, so as to reduce the operational times of the pneumatic clutch, which can be operated quickly at first and then, after the contact for engagement, can again be operated slowly. With these sensors, wear on the friction lining of the clutch disk upon engagement can be taken into account, but not determined.

SUMMARY OF THE INVENTION

Starting from this problem, it is an object of the present invention to provide a process and a device for the contact-free determination of the friction lining wear of a friction clutch that use, as a measurement variable, the movement distance of the pressure plate that results from wear.

Pursuant to this object, and others which will become apparent hereafter, one aspect of the present invention resides in a process in which:

signals are supplied via a sensor, which is arranged outside the clutch housing and connected to an electronic analysis unit;

the signals are generated in dependence on three detecting elements that rotate with the friction clutch;

a first signal series comprises the pulses supplied when the sensor is passed by two detecting elements, which are arranged at a defined axial distance ($X$,) to each other and are connected to a first component;

a second signal series comprises the pulses supplied by the third detecting element, which is connected to a second component;

the pulses from the first and second signal series provide information on the axial position of the respective detecting elements relative to the sensor;

in the analysis unit, the actual axial distance (current distance) between the two detecting elements is determined from the first signal series, and then compared with the previously defined axial distance (reference distance), and a correction value is generated from the found difference;

after this, by comparing the pulses of the third detecting element in the second signal series with the pulses of one of the two detecting elements in the first signal series, the axial distance ($A_1$) of these two detecting elements to each other is found, and is then compared with the distance ($A_0$) between the two detecting elements when the clutch disk is new; and the wear ($V$) on the clutch disk is calculated using the equation $$V = A_0 - A_1 \pm \Delta$$

where $\Delta$ supplies a correction for at least the temperature influence.

According to this process, first, the correction value is found that determines the temperature or speed influence to which the pressure plate is subject. When the clutch is new, the axial distance between the detecting element and the pressure plate to which the detecting element is connected is definitely fixed. The pulse supplied at axially different points in the sensor reflect this distance. Thus, by comparing the current distance with the reference distance, an error is eliminated that would have resulted in an incorrect conclusion about the wear on the friction lining. The current axial distance between the detecting element connected to the clutch housing, on the one hand, and a detecting element connected to the pressure plate, on the other, is also definitely fixed when the friction lining is in the new state. When this axial distance changes in the course of operation, the axial distance of the pulse emission on the sensor is enlarged. This enlargement in distance allows a conclusion to be drawn about the wear on the friction lining, because the pressure plate, due to wear, is moved with the sensors farther in the direction of the flywheel. By adding or subtracting the correction value, the actual amount of wear is then reproducibly established.

A device for determining the friction lining wear in a friction clutch with a clutch housing and a pressure plate arranged axially movably therein, which pressure plate presses a clutch disk equipped with friction linings against a flywheel of an internal combustion engine, is characterized by three detecting elements arranged at a defined axial distance to each other. The detecting elements rotate with the friction clutch. A sensor is arranged outside of the clutch housing to find the axial position of each detecting element. At least one detecting element is connected to the clutch housing and the two other detecting elements are connected to the pressure plate.

Advantageously, the two other detecting elements are arranged on the leaf spring suspension of the pressure plate. In particular, the clutch housing is advantageously equipped with a recess at the level of the two other detecting elements, so as to permit good pulse emission to the sensor.

A simple embodiment of the device is possible when the detecting elements are magnets and the sensor is a permanently magnetic linear contact-free distance sensor.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The drawings show:

FIG. 2 is a partial schematic depiction from FIG. 1; and

FIG. 3 is a view along to Arrow III in FIG. 2.

DETAILED DESCRIPTION OF THE PREFERRED EMBODIMENTS

Figure 1:
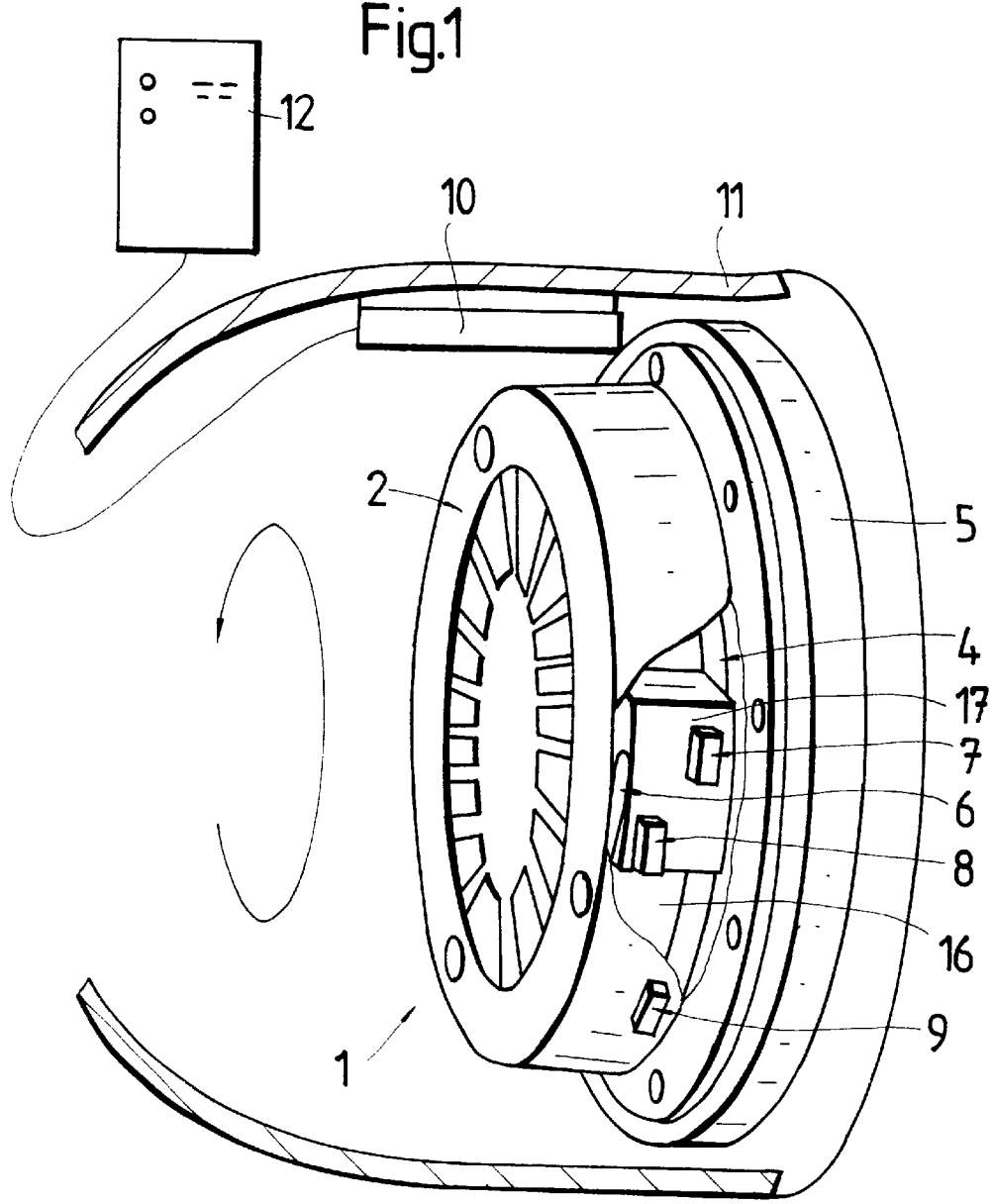
FIG. 1 is a perspective view of the friction clutch arranged in the clutch housing, in simplified fashion.

As can be seen from FIG. 1, the friction clutch 1 is located inside the transmission housing 11 and its clutch housing 2 is connected in rotation-proof fashion to the flywheel 5 of an internal combustion engine (not shown). Arranged in the interior of the clutch housing 2 is a pressure plate 3 pressurized by a diaphragm spring 13, which pressure plate 3 presses a clutch disk 4 equipped with friction linings 14, 15 against the flywheel 5. Connected to the pressure plate 3 are two magnets 7, 8, which have a fixed axial distance $X_1$ to each other that is stored in an analysis unit 12. The magnets 7, 8 can be attached directly radially outside to the pressure plate 3 or on the leaf spring suspension 17, to which the leaf springs 6 are attached for the rotation-proof but axially movable connection of the pressure plate 3 to the clutch housing 2. Arranged radially outside on the clutch housing 2 is a third magnet 9, which is located at any distance $X_2$, which must be determined in the new state of the friction clutch, to one of the magnets 7, 8. In the interior of the transmission housing 11, a sensor 10 is arranged so that the magnets 7, 8, 9 passing the sensor 10 generate a pulse that indicates the current axial position of the magnets 7, 8, 9 relative to the sensor 10. The sensor 10 is also connected to the electronic analysis unit 12.

The distance $X_1$ of the sensors 7, 8 is stored in the analysis unit 12, as is the distance $X_2$ of the magnet 9 on the clutch housing 2 to one of the magnets 7, 8 connected to the pressure plate 3. In FIG. 3, the distance $X_2$ is the distance set between the magnets 7 and 9. The definitely predetermined distance X, between the two magnets 7, 8 also establishes the distance of the magnet 9 to the other of the two magnets 7, 8. Because the sensor 10 can detect only one pulse at any given time, the magnets 7, 8, 9 are arranged offset to each other not only in the axial but also in the radial direction. Each time one of the magnets 7, 8, 9 passes the sensor 10, a pulse is generated. The pulses generated by the magnets 7 and 8 indicate the current distance between these two magnets 7, 8 and are compared in the analysis unit 12 with the reference distance $X_1$ in the new state or installed state of the clutch 1. The value of the difference from the reference distance is the correction value, which takes into account the influences of temperature and speed and is later needed for correction. The axial pulse distance between the magnets 9 and 7 that was determined originally (reference distance) is compared with the current value. When the magnets 7, 8 have the axial reference distance $X_1$, the difference between the reference value $A_0$ and the current value $A_1$ is the amount by which the friction linings 14, 15 have become worn. If a different current state has previously been found, the correction value must be taken into account, by subtraction or addition, in determining the wear.

The clutch housing 2 is provided with an opening or recess 16 which facilitates sensing of the magnets 7, 8 by the sensor 10.

Depending on the space conditions, the arrangement of the magnets 7, 8, 9 can be interchanged as desired. Only two magnets 7, 8 need be installed at a fixed predetermined distance. The relative position of the third magnet 9 to these can be detected at the beginning of the measurement and stored.

The invention is not limited by the embodiments described above which are presented as examples only but can be modified in various ways within the scope of protection defined by the appended patent claims.

We claim:

1. A process for determining wear on a clutch disk equipped with friction linings of a friction clutch, which clutch disk is pressed by a pressure plate arranged in a clutch housing against a flywheel of an internal combustion engine, the process comprising the steps of:

generating signals in dependence on three detecting elements that rotate with the friction clutch;

supplying the signals via a sensor which is arranged outside the clutch housing to an electronic analysis unit, the signals including a first signal series that comprises pulses supplied when the sensor is passed by two detecting elements which are arranged at a defined axial distance to each other and are connected to a first component of the friction clutch, and a second signal series that comprises pulses supplied by a third of the detecting elements, which is connected to a second component of the friction clutch, the pulses from the first and second signal series providing information on an axial position of the respective detecting elements relative to the sensor;

determining, in the analysis unit, an actual axial distance between the two detecting elements from the first signal series, comparing the actual axial distance with the defined axial distance, and generating a correction value from a difference between the axial distances;

subsequently comparing the pulses of the third detecting element in the second signal series with the pulses of one of the two detecting elements in the first signal series for determining an axial distance ($A_1$) between the third detecting element and the one of the two detecting elements and then comparing the distance ($A_1$) with a distance ($A_0$) between the third detecting element and the one of the two detecting elements when the clutch disk is new; and determining wear (V) on the clutch disk using the equation $$V = A_0 - A_1 \pm \Delta$$

where $\Delta$ is a correction for at least a temperature influence.

2. A process according to claim 1, including arranging the two detecting elements on the pressure plate and the third detecting element on the clutch housing.

3. A device for determining friction lining wear in a friction clutch having a clutch housing and a pressure plate arranged therein in axiallly movable fashion, which presses a clutch disk equipped with friction linings against a flywheel of an internal combustion engine, the device comprising:

three detecting elements arranged at a defined axial distance to each other and so as to rotate with the friction clutch; and sensor means arranged outside of the clutch housing for finding an axial position of each of the detecting elements, a first one of the detecting elements being connectable to the clutch housing, and a second and third of the detecting elements being connectable to the pressure plate.

4. A device as defined in claim 3, wherein the second and third detecting elements are arranged on a leaf spring suspension of the pressure plate.

5. A device as defined in claim 3, wherein the clutch housing has a recess at a level of the second and third detecting elements.

6. A device as defined in claim 3, wherein the detecting elements are magnets, and the sensor means includes a permanently magnetic linear contact-free distance sensor.

* * * * *